(12) United States Patent
Whitehead et al.

(10) Patent No.: US 9,225,031 B2
(45) Date of Patent: Dec. 29, 2015

(54) SYSTEM FOR ENERGY GENERATION OR STORAGE ON AN ELECTROCHEMICAL BASIS

(71) Applicants: Adam Whitehead, Eisenstadt (AT); Martin Harrer, Vienna (AT)

(72) Inventors: Adam Whitehead, Eisenstadt (AT); Martin Harrer, Vienna (AT)

(73) Assignee: Cellstrom GmbH, Wiener Neudorf (AT)

( * ) Notice: Subject to any disclaimer, the term of this patent is extended or adjusted under 35 U.S.C. 154(b) by 371 days.

(21) Appl. No.: 13/814,865

(22) PCT Filed: Dec. 20, 2012

(86) PCT No.: PCT/EP2012/076324
§ 371 (c)(1),
(2) Date: Mar. 1, 2013

(87) PCT Pub. No.: WO2013/110421
PCT Pub. Date: Aug. 1, 2013

(65) Prior Publication Data
US 2014/0072897 A1    Mar. 13, 2014

(30) Foreign Application Priority Data
Jan. 23, 2012  (AT) ................ A 0069/2012

(51) Int. Cl.
*H01M 8/18*    (2006.01)
*H01M 8/20*    (2006.01)
*H01M 8/04*    (2006.01)

(52) U.S. Cl.
CPC .......... *H01M 8/188* (2013.01); *H01M 8/04186* (2013.01); *H01M 8/20* (2013.01); *H01M 2300/0002* (2013.01); *Y02E 60/528* (2013.01)

(58) Field of Classification Search
CPC ....... H01M 8/188; H01M 8/18; H01M 8/184; H01M 8/20; H01M 8/04186; H01M 2300/0002; Y02E 60/528
See application file for complete search history.

(56) References Cited

U.S. PATENT DOCUMENTS

| 4,159,366 | A | | 6/1979 | Thaller |
| 5,258,241 | A | | 11/1993 | Ledjeff et al. |
| 6,143,443 | A | * | 11/2000 | Kazacos et al. ............... 429/204 |

FOREIGN PATENT DOCUMENTS

| EP | 113159 | 7/1984 |
| JP | H07211347 | 8/1995 |
| WO | 2009106452 | 9/2009 |

OTHER PUBLICATIONS

English Abstract of JP H07211347.

* cited by examiner

*Primary Examiner* — Raymond Alejandro
(74) *Attorney, Agent, or Firm* — Dykema Gossett PLLC

(57) ABSTRACT

A system for energy generation or storage on an electrochemical basis includes at least one flow cell, each flow cell including two half-cells through which differently charged electrolyte liquids (21, 22) flow and which are separated by a membrane, at least one electrode being disposed in each of these half-cells, and a tank for each of the electrolyte liquids. A common gas volume (23) connecting the tanks is provided, and at least one catalyst (24) for reducing a positive reaction partner of then redox pair in contact with the positive electrolyte liquid (22) and also with the common gas volume (23) is disposed in the tank for the positive electrolyte liquid (22).

9 Claims, 2 Drawing Sheets

US 9,225,031 B2

SYSTEM FOR ENERGY GENERATION OR STORAGE ON AN ELECTROCHEMICAL BASIS

BACKGROUND OF THE INVENTION

The invention relates to a system or apparatus for energy generation or storage on an electrochemical basis, which includes at least one flow cell, each flow cell including two half-cells through which differently charged electrolyte liquids flow and which are separated by a membrane, at least one electrode being disposed in each of these half-cells, a tank being provided for each of the electrolyte liquids, and in particular a system in which the electrolyte liquid in the positive half-cell in the charged state contains tetravalent and pentavalent vanadium, sulphuric acid and optionally further additives.

THE PRIOR ART

In almost every electrochemical energy storage system which is used in practice with aqueous electrolyte, a certain proportion of gaseous hydrogen is produced. For redox flow batteries, in particular vanadium redox flow batteries, this constitutes a particular problem since hydrogen is formed electrochemically on the negative electrode in accordance with the reaction $2H^+ + 2e^- \leftrightarrow H_2$ and hinders the desired reaction, for example $V^{3+} + e^- \leftrightarrow V^{2+}$ on the negative electrode.

The strength of the hydrogen evolution on the negative electrode is considerably higher than parasitic reactions (e.g., $O_2$ or $CO_2$ formation) on the positive electrode, resulting in a difference in the state of charge (SOC) on the positive and negative electrodes. For the vanadium battery this has the consequence that, after a certain duration of the hydrogen formation, the negative electrolyte has more $V^{3+}$ than the $VO^{2+}$ contained in the positive electrolyte. Thus, the capacity of the system is reduced.

In order to take into account this hydrogen formation, or the imbalance in the state of charge for redox flow batteries, different solutions have already been proposed, but these are costly in structural and control terms. Thus, according to N. H. Hagedorn, NASA redox storage system development project, in Final Report DOE/NASA/12726-24, NASA Lewis Research Center, Cleveland, Ohio (1984) and also U.S. Pat. No. 4,159,366, the use of rebalance cells is proposed for a Fe—Cr redox flow battery. These consist Inter alia of a hydrogen anode and an iron cathode which are separated by an ion exchange membrane and are supplied with hydrogen on the side of the gas electrode. Later, a version was developed in which chlorine was preferably produced Instead of the hydrogen reduction. A similar solution is also presented in U.S. Pat. No. 5,258,241.

JP 07211347 discloses a rebalance cell, inter alia, for vanadium redox flow batteries, in which $VO_2^+$ on one electrode of a cell divided by a membrane is reduced to $VO^{2+}$ and on the other electrode oxygen is produced from aqueous sulphuric acid. This design has similar disadvantages to the systems described in the previous paragraph. In addition, a periodic topping up with water is necessary in order to prevent dehydration of the anode half-cell, and energy input (electrical energy) is necessary in order to produce the balance.

Rebalance cells must also be monitored in a costly manner, since if the charge through the cell is too great, the electrolyte suffers a reduction in usable capacity since the cell then becomes unbalanced in the opposite direction.

Gas reforming devices are known and customary for lead acid batteries. However, an application to redox flow batteries with electroactive species in solution is not provided. A catalyst is used here for re-establishment of the state of charge of the electroactive species.

SUMMARY OF THE INVENTION

According to the invention, therefore, avoiding the above-mentioned disadvantages a new solution is proposed which is characterized in that a common gas volume connecting the tanks is provided, and that at least one catalyst for reducing the positive reaction partner of the redox pair in contact with the positive electrolyte liquid and also with the common gas volume is disposed in the tank for the positive electrolyte liquid. Thus, the system according to the invention can function without additional cells with circulation, is passive, and is even effective without the need for active pumping or forced discharge. The required hydrogen is formed within the system, does not have to be externally supplied, and is used for "discharging" the positive electrolyte instead of for "charging" the negative electrolyte.

Furthermore, the frequent monitoring of the state of charge of each electrolyte Independently, which is necessary in rebalance cells and is provided there in order to determine the magnitude of the charge for setting of the state of charge in a usable range, can be avoided or considerably reduced. This is very complex and also costly.

According to a first embodiment of the invention the catalyst is disposed close to an inlet and/or outlet for the electrolyte liquid. Thus, a constant flow over the catalyst is ensured without complex apparatus.

The catalyst is advantageously applied to an arrangement floating on the positive electrolyte liquid, preferably on a membrane fitted on a frame, whereby the contact of the catalyst with the positive electrolyte liquid and also with the common gas volume is achieved in a simple manner.

For this purpose another variant provides that the catalyst is applied to a fabric which is partially immersed in the positive electrolyte liquid.

In order to enable simple access of the hydrogen-containing gas to the catalyst and at the same time to allow access of the positive electrolyte to the other, uncoated side, the catalyst advantageously has at least one gas diffusion layer, preferably containing conductive fibers.

A particularly reliable embodiment of an arrangement according to the Invention is characterized in that catalysts based on platinum and/or iridium dioxide are utilized.

The system according to the invention system is preferably provided with devices for generating or maintaining a gas flow over the catalyst, which contributes to an improvement in the catalytic reaction.

According to a further embodiment, devices are advantageously provided for equalizing the pressure of the combined gas volume relative to the environment.

All the above features are also used particularly advantageously and so as to achieve the aforementioned effects and advantages in a system for energy generation or storage on an electrochemical basis, in which the electrolyte liquid in the positive half-cell in the charged state contains tetravalent and pentavalent vanadium, sulphuric acid and optionally further additives. Thus, the electrochemical cells are used for charging and also for discharging the vanadium redox flow battery used instead of merely discharging it as in a redox fuel cell.

Although, the objective invention is conceived principally for use with vanadium redox flow batteries, it can be used in principle for all types of redox flow batteries with aqueous electrolyte, for example also based on iron and chromium.

BRIEF DESCRIPTION OF THE DRAWINGS

In the following description the invention will be explained in greater detail by means of exemplary embodiments and with reference to the appended drawings.

DETAILED DESCRIPTION OF THE DRAWINGS

Figure 1:
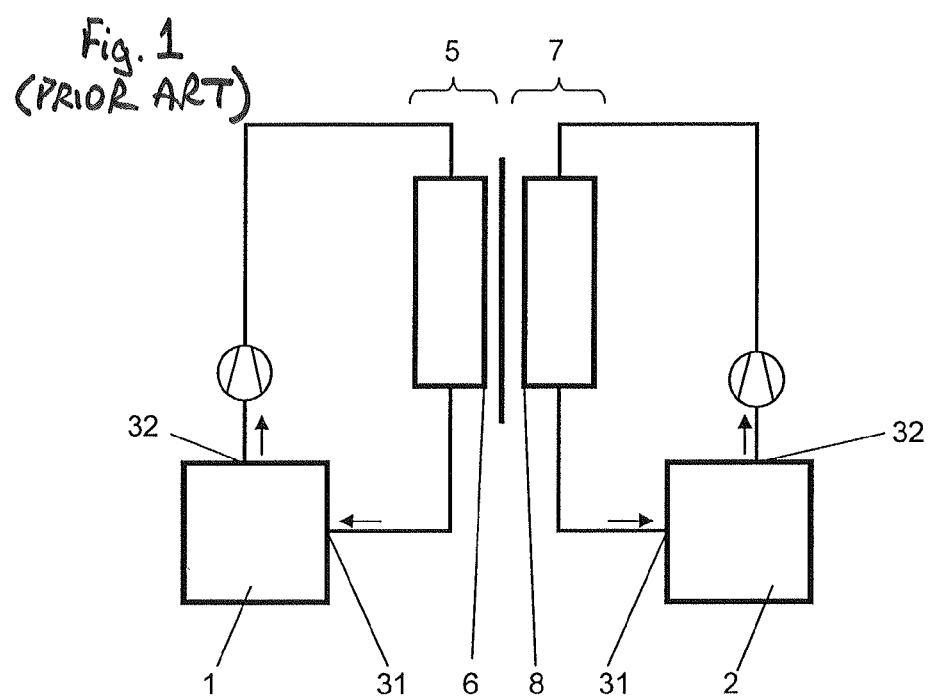
FIG. 1 shows a prior art redox battery system.

FIG. 1 shows a known redox battery system which includes two half cells 5, 7 separated by a membrane, each half cell including an electrode 6, 8 and tanks 1, 2 with inlet and outlet ports 31, 32.

Figure 2:
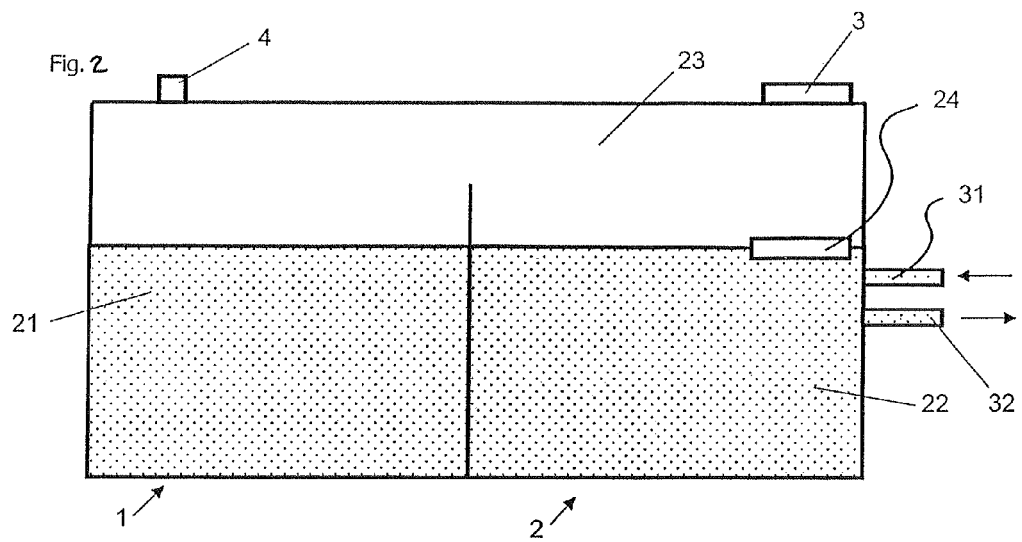
FIG. 2 shows a schematic representation of the tanks of a redox flow battery with a catalyst according to the invention close to the inlet of the positive electrolyte.

FIG. 2 shows the tanks 1, 2 of a flow cell of a redox flow battery as a preferred example for a system for energy generation or storage on an electrochemical basis. The tanks contain the differently charged electrolyte liquids, which for energy generation or energy storage are circulated in the half-cells and then back again into the tank, wherein the negative electrolyte liquid is denoted by 21 and the positive electrolyte liquid is denoted by 22.

The tanks may be spatially separated vessels, but, as shown in FIG. 2, may also be formed as two compartments divided by a partition 5 in a common vessel, which compartments directly adjoin one another. In the charged state the positive electrolyte liquid may for example contain tetravalent and pentavalent vanadium, sulphuric acid and optionally further additives. Above the electrolyte liquids 21, 22 a combined gas volume 23 which connects these two tanks is preferably provided above the two tanks. In the case of a common vessel with two compartments for the electrolyte liquids 21, 22, the combined gas volume 23 is formed by the region above the compartments which is not divided by the partition. Furthermore, at least one catalyst 24 for reducing the positive reaction partner of the redox pair in contact with the positive electrolyte liquid and also with the combined gas volume is disposed in the tank for the positive electrolyte 22. As can be seen from FIG. 2, the catalyst 24 is advantageously disposed in such a way that the positive electrolyte liquid 22 flows periodically or continually through one of the surfaces thereof, which is affected here by placing it close to the inlet 31 for the electrolyte liquid. Placing it close to the outlet 32 would also be possible.

The catalyst 24 consists of a structure comprising catalytically active material or a substrate coated with this material. Due to the arrangement of the catalyst, a part-zone of the catalyst 24 is in contact with the positive electrolyte liquid 22, and another part-zone is in contact with the hydrogen-containing gas formed on the negative electrode. In such a way a three-phase boundary surface is produced between the positive electrolyte 22, the gas in the volume 23 and the catalyst 24.

Figure 3:
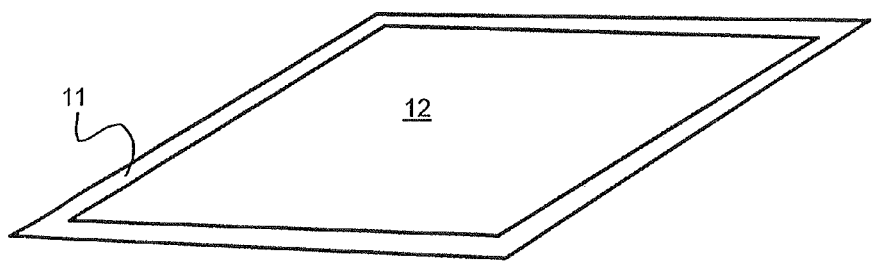
FIG. 3 is an advantageous structural embodiment of a catalyst according to the invention.

Since the volume of the electrolyte liquids 21, 22 in the tanks and thus the electrolyte level typically fluctuates by several centimeters (because of the mass transport through the ion exchange membrane between the half-cells), the catalyst 24 is either partially immersed in the positive electrolyte liquid 22 or advantageously designed for tracking this fluctuation in levels, for example by embodiment as a floating body with catalytically effective coating. An example of this is Illustrated in FIG. 3, which shows a floatable frame 11, advantageously made of PVC, PE, PP or other stable material) with a catalytically coated membrane 12 fixed therein.

Suitable membranes may be ion exchange membranes (such as for example Nafion® from DuPont) or microporous types (such as for instance microporous polyethylene separators, often used in lead-acid batteries). The catalytically effective coating may be present on one side or on both sides and could also be applied to conductive particles (such as for instance carbon black) with which the membrane is then coated (as is customary per se for fuel cells).

A catalyst which is similar to a gas diffusion electrode and has no membrane support would be conceivable. This comprises a catalytically effective layer on a water-repellent, porous and electrically conductive layer. In addition, this layer may also contain electrically conductive fibers (in particular graphite fibers such as for example a carbon fabric) in order to increase the active surface for the reduction reaction. Moreover, the water-repellent, porous and electrically conductive layer enables simple access for the hydrogen-containing gas to the catalyst material from one side, whilst access for the positive electrolyte liquid to the other, uncoated side is maintained.

As a result, in the case of the vanadium redox flow battery a reduction of $VO2^+$ in the positive tank is affected using the $H_2$ formed on the negative electrode, so that the state of charge in both tanks is kept the same (i.e., the average oxidation state of the vanadium should be kept at the initial value of 3.5).

The device according to the invention operates passively, i.e., without energy input from external sources, solely by the reaction between the gaseous hydrogen and the electroactive species in the positive electrolyte 22 in the charged oxidation state, for example the reaction $VO_2^+ + H^+ + \frac{1}{2}H_2 \leftrightarrow VO^{2+}$ $H_2O$. Although this reaction is thermally advantageous ($\Delta G^0 \sim -97$ kJ $mol^{-1}$), it takes place only to an insignificant extent at room temperature and without the presence of a suitable catalyst.

Of course a plurality of catalytic devices 24 can be provided in the tank of the positive electrolyte 22 in order to improve the use of the hydrogen. Furthermore, devices 3 for effecting a gas flow over the catalyst 24 can be provided, either active devices or devices for generating and guiding convection current.

In principle all possible substances can be used as catalytically effective substances, wherein finely dispersed Pt, Pt—Ru, Pt—Mo, Pt—W, Pt—Co—Mo, Pt—Co—W, Pd, Pt—Cr, $IrO_2$ etc., are advantageous in particular for the hydrogen reduction reaction in an acidic environment. It is important here to have sufficient stability in relation to dissolution in the electrolyte.

Since the consumption of the hydrogen gas can lead to a pressure reduction in the gas volume 23 above the tank relative to the environment, devices 4 for equalizing the pressure are advantageously provided, for example for Introducing inert gas from a compressed gas source. On the other hand, overpressure due to the hydrogen formation can be dissipated by discharging the gas from the volume 23 via a conduit with integrated flame arrester.

The advantages of the arrangement according to the invention will be explained by means of the following examples of applications.

Example of Application 1

In a test system with a cell with a subdivided tank and common gas volume fully charged positive and negative electrolytes were introduced, wherein the positive electrolyte nominally had 0.8 M $(VO_2)_2SO_4$, 3.2 M $H_2SO_4$ and the negative electrolyte nominally had 1.6 M $VSO_4$, 2.4 M $H_2SO_4$. The cell was kept at constant 1.75 V, so that the electrolytes were kept fully charged. In the course of this the holding current was continuously measured.

Hydrogen gas was pumped into the common gas volume above the tank until the concentration thereof reached 90%, after which the tank was isolated and sealed. The hydrogen concentration was measured continuously by means of a gas sensor which operates in the absence of oxygen. The system was operated with a catalyst which was placed solely in the gas volume and was not in contact with the electrolyte, wherein the holding current was measured at constant approximately 40 mA.

Then a Ti lattice coated with $IrO_2$ was partially immersed in the electrolyte, so that about half of the lattice was located in the positive electrolyte and the other half in the gas volume lying above it. After approximately five minutes an increase in the current through the cell in response to a reduction in the positive electrolyte could be observed. After 39 minutes the catalytic lattice was removed. For several minutes the current remained above the base level until the positive electrolyte was fully charged again. Then a current of 40 mA was established again.

Thus the effectiveness of the catalyst for the reduction of the positive electrolyte could be demonstrated by oxidation of the hydrogen in the gas volume.

Example of Application 2

The above test was repeated with a graphite felt of 20 cm² area and 5 mm thickness which was wound around the lower, immersed part of the Ti lattice coated with $IrO_2$. The catalyst arrangement remained submerged for 36 minutes, was then removed and subsequently the surplus charge was measured.

The results were as follows:

|  | Charge [mAh] | Immersion time [h] | Equivalent rebalance current [mA] |
|---|---|---|---|
| $IrO_2$—Ti | 11.5 | 0.63 | 18 |
| $IrO_2$—Ti + graphite felt | 104.8 | 0.6 | 175 |

These figures show that the additional surface area of the felt was advantageous for the reduction of the $VO_2^+$. That is to be expected if the reaction rate is limited by the vanadium reduction instead of by the hydrogen oxidation (which occurs on the platinum).

The $IrO_2$ on Ti catalyst (and also Pt on Ti) and the catalyst with $IrO_2$ on Ti in conjunction with the graphite felt had a slight effect for the recombination of the hydrogen with the positive electrolyte.

Figure 4:
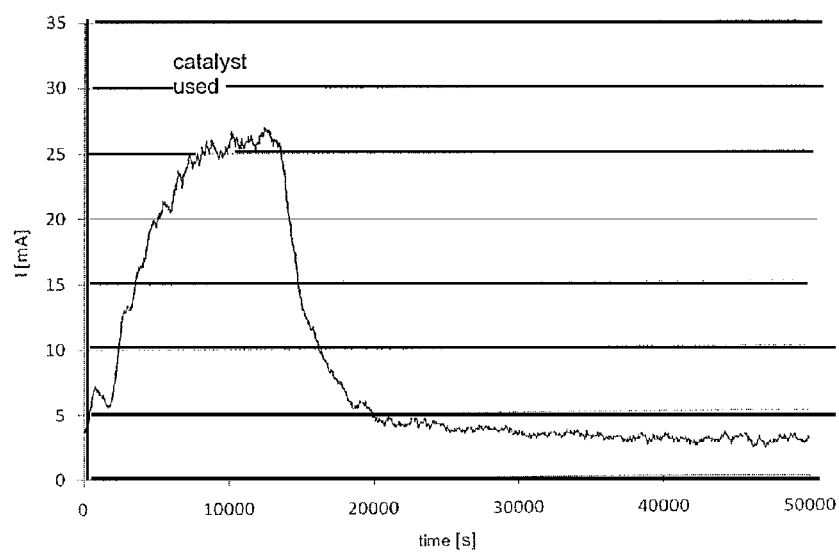
FIG. 4 is a diagram of the current generated by a small electrochemical cell with brief use of a catalyst according to the invention.

However, a membrane arrangement was found effective for a fuel cell in which a catalytic Pt—Ir coating was applied to a membrane. With this membrane in the gas volume (not in contact with the electrolyte), a current of 3 mA flowed through the cell. After contacting the catalyst with the electrolyte (it floated on the electrolyte liquid, with good contact with both electrolyte and also hydrogen-containing gas), the current increased to approximately 27 mA. After removal of the catalyst from the electrolyte, the current dropped again slowly until all V(IV) was reoxidized. FIG. 4 shows a current/time diagram for this similar experiment at 83% concentration of the hydrogen and partial immersion of a membrane-borne catalyst material between the time stamps at 2000 and 13000 seconds.

The icatalytic average current which exceeded the base current was relatively independent of the hydrogen content in the gas volume, as the following table shows:

| Average $H_2$-concentration | Icatalytic [mA] |
|---|---|
| 83% | 24 |
| 28% | 21 |
| 8% | 23 |

The surface area of the membrane-borne catalyst was 5.0 cm² and the experiment was carried out at room temperature.

The invention claimed is:

1. An apparatus for energy generation or storage on an electrochemical basis, comprising:
    at least one flow cell comprising a first half-cell containing at least one first electrode and a second half-cell containing at least one second electrode, said first and second half-cells being separated by a membrane,
    a first tank containing a negatively charged electrolyte liquid and comprising a first gas volume,
    a first inlet and outlet for connecting the first tank to said first half-cell whereby said negative electrolyte liquid is circulated through the first tank and the first half-cell,
    a second tank containing a positively charged electrolyte liquid and comprising a second gas volume,
    a second inlet and outlet for connecting the second tank to said second half-cell whereby said positive electrolyte liquid is circulated through the second tank and the second half-cell,
    said first gas volume and said second gas volume being connected to form a common gas volume, and
    a catalyst positioned in said second tank in contact with both said positive electrolyte liquid and said common gas volume, whereby as a result of said circulation of said positive electrolyte liquid, the positive electrolyte liquid flows periodically or continually over said catalyst and said catalyst reduces a positive reaction partner of a redox pair in said positive electrolyte liquid.

2. The apparatus as claimed in claim 1, wherein the catalyst floats on a surface of said positive electrolyte liquid and comprises a membrane fixed on a frame.

3. The apparatus as claimed in claim 1, wherein the catalyst comprises a fabric immersed in the positive electrolyte liquid.

4. The apparatus as claimed in claim 1, wherein the catalyst comprises at least one gas diffusion layer containing conductive fibers.

5. The apparatus as claimed in claim 1, wherein catalysts said catalyst comprises platinum and/or iridium dioxide.

6. The apparatus as claimed in claim 1, including a device for generating or maintaining a gas flow over the catalyst.

7. The apparatus as claimed in claim 1, including a device for equalizing a pressure of the common gas volume relative to environment.

8. An apparatus for energy generation or storage on an electrochemical basis, comprising:
    at least one flow cell comprising a first half-cell containing at least one first electrode and a second half-cell containing at least one second electrode, said first and second half-cells being separated by a membrane,
    a first tank containing a negatively charged electrolyte liquid and comprising a first gas volume, a first inlet and outlet for connecting the first tank to said first half-cell whereby said negative electrolyte liquid is circulated through the first tank and the first half-cell, a second tank containing a positively charged electrolyte liquid and comprising a second gas volume, said positively charged electrolyte liquid in a charged state containing tetravalent and pentavalent vanadium and sulphuric acid, a second inlet and outlet for connecting the second tank to said second half-cell whereby said positive electrolyte liquid is circulated through the second tank and the second half-cell, said first gas volume and said second gas volume being connected to form a common gas volume, and a catalyst positioned in said second tank in contact with both said positive electrolyte liquid and said common gas volume, whereby as a result of said circulation of said positive electrolyte liquid, the positive electrolyte liquid flows periodically or continually over said catalyst and said catalyst reduces a positive reaction partner of a redox pair in said positive electrolyte liquid.

9. An apparatus for energy generation or storage on an electrochemical basis, comprising:

at least one flow cell comprising a first half-cell containing at least one first electrode and a second half-cell containing at least one second electrode, said first and second half-cells being separated by a membrane, an enclosed vessel which contains a partition that extends upwardly therein to create first and second liquid-containing tanks separated by said partition and a common gas volume thereabove, a first inlet and outlet for connecting the first tank to said first half-cell whereby said negative electrolyte liquid is circulated through the first tank and the first half-cell, a second inlet and outlet for connecting the second tank to said second half-cell whereby said positive electrolyte liquid is circulated through the second tank and the second half-cell, and a catalyst positioned in said second tank in contact with both said positive electrolyte liquid and said common gas volume, whereby as a result of said circulation of said positive electrolyte liquid, the positive electrolyte liquid flows periodically or continually over said catalyst and said catalyst reduces a positive reaction partner of a redox pair in said positive electrolyte liquid.

* * * * *